United States Patent
Liu et al.

(10) Patent No.: US 10,282,643 B2
(45) Date of Patent: May 7, 2019

(54) METHOD AND APPARATUS FOR OBTAINING SEMANTIC LABEL OF DIGITAL IMAGE

(71) Applicant: Baidu Online Network Technology (Beijing) Co., Ltd., Beijing (CN)

(72) Inventors: Xiao Liu, Beijing (CN); Tian Xia, Beijing (CN); Jiang Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 246 days.

(21) Appl. No.: 15/246,413

(22) Filed: Aug. 24, 2016

(65) Prior Publication Data

US 2017/0220907 A1 Aug. 3, 2017

(30) Foreign Application Priority Data

Jan. 28, 2016 (CN) .......................... 2016 1 0059946

(51) Int. Cl.
*G06K 9/72* (2006.01)
*G06K 9/62* (2006.01)
(Continued)

(52) U.S. Cl.
CPC ......... *G06K 9/726* (2013.01); *G06K 9/00624* (2013.01); *G06K 9/6267* (2013.01); *G06K 9/6269* (2013.01); *G06K 9/66* (2013.01)

(58) Field of Classification Search
None
See application file for complete search history.

(56) References Cited

U.S. PATENT DOCUMENTS 8,503,791 B2 * 8/2013 Conwell ........... G06F 17/30265
382/190
8,620,078 B1 * 12/2013 Chapleau ............... G06K 9/344
382/173

(Continued)

FOREIGN PATENT DOCUMENTS

CN 104484666 A 4/2015
JP 2013097631 A 5/2013

*Primary Examiner* — Iman K Kholdebarin
(74) *Attorney, Agent, or Firm* — Lathrop Gage LLP

(57) ABSTRACT

The present application discloses a method and apparatus for obtaining a semantic label of a digital image. An implementation of the method includes: obtaining the digital image; looking up a semantic label model corresponding to the digital image, the semantic label model being used for representing correlation between digital images and semantic labels, and a semantic label being used for literally describing a digital image; and introducing the digital image into the semantic label model to obtain full-image recognition information and local recognition information corresponding to the digital image, and combining the full-image recognition information and the local recognition information to form a semantic label, the full-image recognition information being a summarized description of the digital image, and the local recognition information being a detailed description of the digital image. According to the implementation, the digital image is obtained first, then a semantic label model corresponding to the digital image is looked up, and a semantic label is obtained by using the semantic label model, which may improve the accuracy of obtaining the semantic label corresponding to the digital image.

9 Claims, 5 Drawing Sheets

(51) Int. Cl.
*G06K 9/66* (2006.01)
*G06K 9/00* (2006.01)

(56) References Cited

U.S. PATENT DOCUMENTS

| | | | |
|---|---|---|---|
| 9,704,054 B1* | 7/2017 | Tappen | G06K 9/46 |
| 2009/0016599 A1* | 1/2009 | Eaton | G06K 9/00335 |
| | | | 382/159 |
| 2009/0232354 A1* | 9/2009 | Camp, Jr. | G06Q 30/02 |
| | | | 382/103 |
| 2011/0044498 A1* | 2/2011 | Cobb | G06T 11/206 |
| | | | 382/103 |
| 2012/0268612 A1* | 10/2012 | Wang | G06K 9/00624 |
| | | | 348/207.1 |
| 2016/0042253 A1* | 2/2016 | Sawhney | G06K 9/6255 |
| | | | 382/190 |
| 2016/0063734 A1* | 3/2016 | Divakaran | G06K 9/6202 |
| | | | 382/110 |
| 2016/0350930 A1* | 12/2016 | Lin | G06K 9/66 |
| 2017/0024899 A1* | 1/2017 | Hammoud | H04W 4/025 |
| 2017/0220907 A1* | 8/2017 | Liu | G06K 9/00624 |
| 2017/0301108 A1* | 10/2017 | Estrada | G06T 7/344 |

* cited by examiner

# METHOD AND APPARATUS FOR OBTAINING SEMANTIC LABEL OF DIGITAL IMAGE

CROSS-REFERENCE TO RELATED APPLICATION

This application is related to and claims priority from Chinese Application No. 201610059946.4, filed on Jan. 28, 2016, entitled "METHOD AND APPARATUS FOR OBTAINING SEMANTIC LABEL OF DIGITAL IMAGE," the entire disclosure of which is hereby incorporated by reference.

TECHNICAL FIELD

The present application relates to the field of information processing technology, specifically to the field of image recognition technology, and more specifically to a method and apparatus for obtaining a semantic label of a digital image.

BACKGROUND

Image recognition technology has been widely used in daily life. For example, information on a number plate of a passing vehicle may be recognized by using the image recognition technology. The image recognition technology often needs to convert a non-digital image into a digital image, and then recognizes the digital image. Alternatively, the image recognition technology directly obtains a digital image and recognizes the digital image. However, the information obtained by recognizing the image by using the existing image recognition technology is insufficient, and more image information cannot be given. In the above example that the image recognition technology is used for recognizing the information on a number plate, the existing image recognition technology may recognize an image of the number plate, but the detailed information (e.g., numbers, characters on the number plate) of the image of the number plate needs to be manually recognized.

A method for recognizing the granularity of an image is a method to establish an association between an image and a semantic label and describing the image by using the semantic label with the association. The granularity refers to further sub-class recognition of digital image content on the basis of recognizing the content type of the digital image. A semantic label is used for literally illustrating the digital image. For example, for an image containing a puppy, the existing image recognition technology may recognize only the image of the puppy, but cannot provide more information of the puppy. The image granularity recognition method may be used for recognizing not only the image of the puppy, but also the detailed information of the puppy, for example, the breed and color (i.e. granularity information), and outputting the detailed information of the puppy in the form of a semantic label. It should be noted that the granularity is a relative concept, and the meaning of the granularity may be different, for different digital images or image contents.

The image granularity recognition process of the existing image granularity recognition method is as follows. An image feature of the entire image, or a local feature of the image in a manually pre-selected image area is extracted first. Then, a semantic label is set for the image feature or the local feature. Since the semantic label is obtained based on the extracted image feature or the local feature obtained by manually selecting an image area, no accurate semantic label may be provided and it is difficult to apply the method widely.

SUMMARY

The present application provides a method and apparatus for obtaining a semantic label of a digital image, in order to solve the problems mentioned in the background.

In a first aspect, the present application provides a method for obtaining a semantic label of a digital image, including: obtaining the digital image; looking up a semantic label model corresponding to the digital image, the semantic label model being used for representing correlation between digital images and semantic labels, and a semantic label being used for literally describing a digital image; and introducing the digital image into the semantic label model to obtain full-image recognition information and local recognition information corresponding to the digital image, and combining the full-image recognition information and the local recognition information to form a semantic label, the full-image recognition information being a summarized description of the digital image, and the local recognition information being a detailed description of the digital image.

In a second aspect, the present application provides an apparatus for obtaining a semantic label of a digital image, including: a digital image obtaining unit, configured to obtain the digital image; a semantic label model lookup unit, configured to look up a semantic label model corresponding to the digital image, the semantic label model being used for representing correlation between digital images and semantic labels, and a semantic label being used for literally describing a digital image; and a semantic label obtaining unit, configured to introduce the digital image into the semantic label model to obtain full-image recognition information and local recognition information corresponding to the digital image, and combine the full-image recognition information and the local recognition information to form a semantic label, the full-image recognition information being a summarized description of the digital image, and the local recognition information being a detailed description of the digital image.

In a third aspect, the present application provides a device for obtaining a semantic label of a digital image, including: the apparatus for obtaining the semantic label of the digital image in the second aspect.

According to the method and apparatus for obtaining the semantic label of the digital image provided in the present application, the digital image is obtained first, then a semantic label model corresponding to the digital image is looked up, and a semantic label is obtained by using the semantic label model, which may improve the accuracy of obtaining the semantic label corresponding to the digital image.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF PREFERRED EMBODIMENTS

The present application will be further described below in detail in combination with the accompanying drawings and the embodiments. It should be appreciated that the specific embodiments described herein are merely used for explaining the relevant invention, rather than limiting the invention.

In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
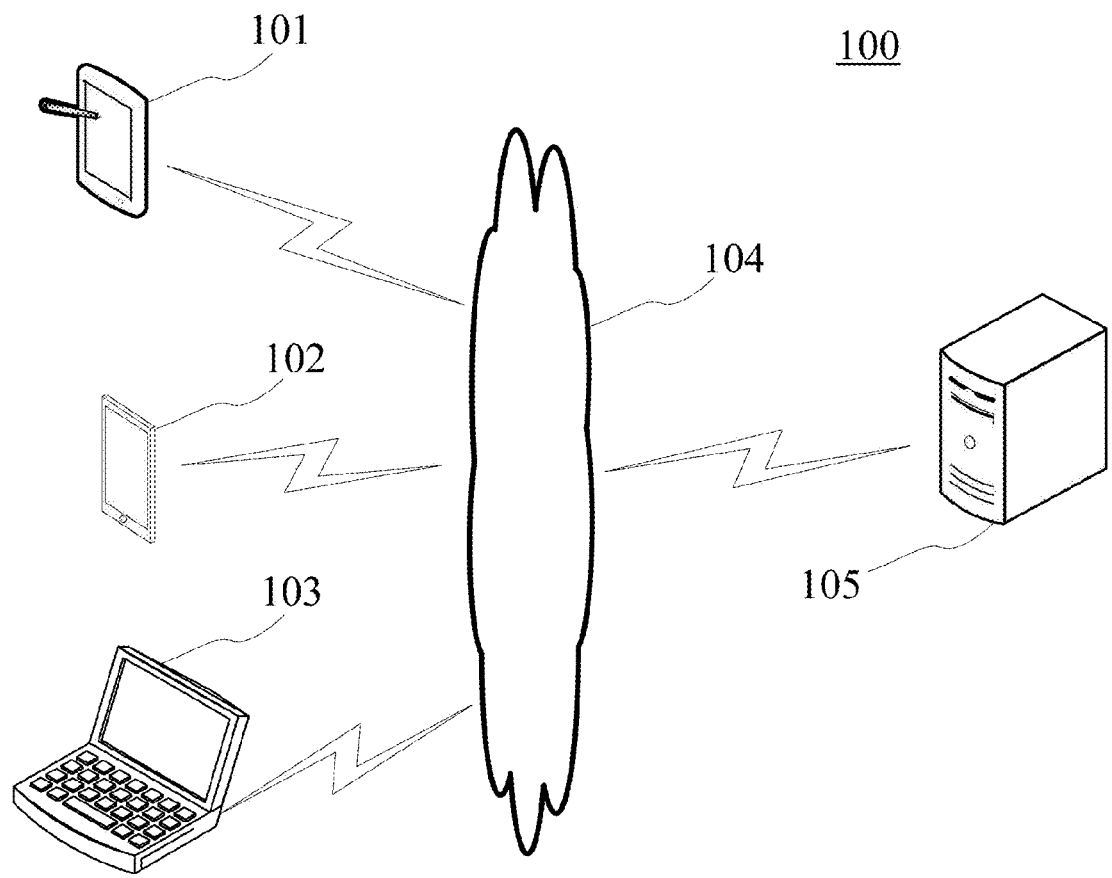
FIG. 1 is an exemplary system architecture diagram to which the present application may be applied.

FIG. 1 shows an exemplary architecture of a system 100 which may be used by a method for obtaining a semantic label of a digital image or an apparatus for obtaining a semantic label of a digital image according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to receive or send digital images, etc. Various picture applications and network applications, such as a picture viewer and a webpage browser, may be installed on the terminal devices 101, 102 and 103.

The terminal devices 101, 102 and 103 may be various electronic devices having a display screen and a picture viewer or webpage browser, including but not limited to, smart phones, tablet computers, laptop computers and the like.

The server 105 may be a server analyzing pictures and describing pictures with texts, for example, a server configuring semantic labels for digital images sent from the terminal devices 101, 102 or 103. The server 105 may analyze and process the received digital images and configure corresponding semantic labels for the digital images.

It should be noted that the method for obtaining a semantic label of a digital image according to the embodiments of the present application is generally executed by the server 105, and accordingly, the apparatus for obtaining a semantic label of a digital image is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
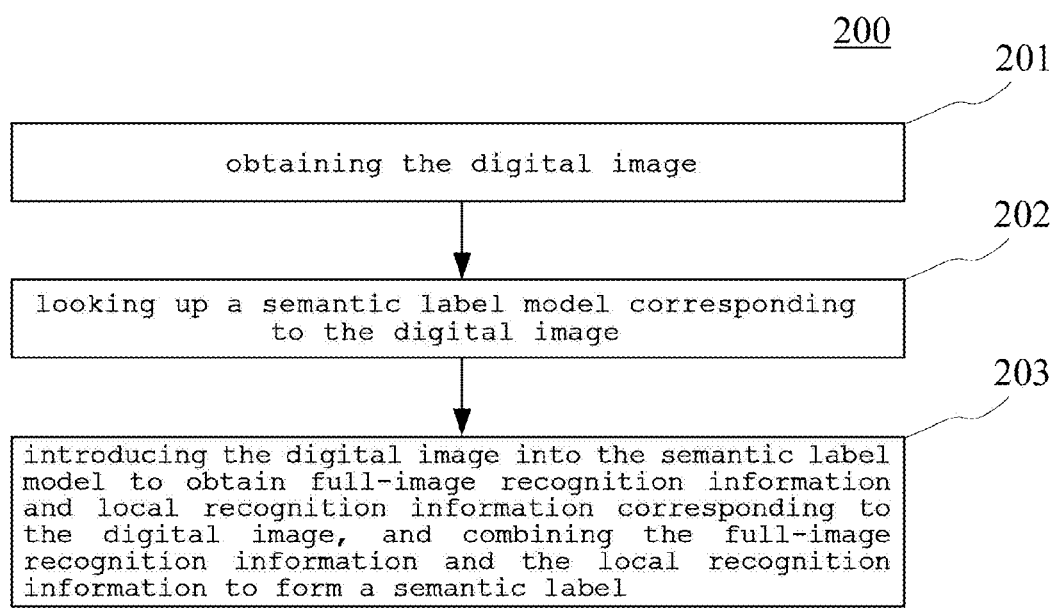
FIG. 2 is a flowchart of a method for obtaining a semantic label of a digital image according to an embodiment of the present application.

Referring to FIG. 2, it shows a process 200 of a method for obtaining a semantic label of a digital image according to an embodiment.

As shown in FIG. 2, the method for obtaining the semantic label of the digital image in the embodiment includes the following steps.

Step 201, obtain the digital image.

In the embodiment, an electronic device (for example, the server as shown in FIG. 1) on which the method for obtaining the semantic label of the digital image runs may receive data from, and send data to the terminal devices (for example, the terminal devices 101, 102 and 103 as shown in FIG. 1) in a wired or a wireless connection to obtain the semantic label.

The picture application and the network application on the terminal devices 101, 102 and 103 send pictures to the server 105. The server 105 can configure the semantic label only for a digital image. Thus, when an image in the terminal device 101, 102 or 103 is a non-digital image, the terminal device 101, 102 or 103 may send the non-digital image to the server 105, and then the server 105 convert the non-digital image into a digital image. Alternatively, the terminal device 101, 102 or 103 may directly convert the non-digital image into a digital image and send the digital image to the server 105.

Step 202, look up a semantic label model corresponding to the above-mentioned digital image.

The semantic label model is used for representing the correlation between digital images and semantic labels, and the semantic label is used to literally describe the digital image. Different digital images have different contents. Thus, different semantic label models are needed to match the contents of the digital images. Otherwise, the semantic label output from the semantic label model will not match the content of the digital images. For example, the content of a digital image includes a puppy. When the digital image is input to a semantic label model related to birds, the obtained semantic label must be a semantic label related to the birds. Therefore, the semantic label model corresponding to the digital image needs to be looked up first.

In some alternative implementations of the embodiment, the looking up of a semantic label model corresponding to the digital image may include the following steps.

First step, carry out a class analysis on the digital image to determine class information of the digital image.

The the class information includes at least one of numeral, character, person, animal and food. To look up the semantic label model corresponding to the digital image, the class information of the digital image, namely, the class of the content of the digital image, needs to be known first. Generally, the class information may include numeral, character, person, animal, food, machinery and the like, and may also include other contents based on practical requirements.

Second step, look up the semantic label model corresponding to the class information.

After the class information of the digital image is determined, the semantic label model corresponding to the digital image may be determined by using the class information.

In some alternative implementations of the embodiment, the method of the embodiment may further include establishing the semantic label model, and the establishing may include the following steps.

First step, extract digital images and semantic labels from a digital image set and a semantic label set, respectively.

When a semantic label model is established, the correlation between the digital images and the semantic labels needs to be determined by using the digital image set and the semantic label set correlated to the digital image set. Thus, the digital images and the semantic labels need to be extracted first.

Second step, classify the digital images into a set of at least one class of digital images according to the class information, the class information including at least one of numeral, character, person, animal and food.

The digital image set includes various classes of digital images, each class of digital images have their respective features, and the corresponding semantic labels may be determined according to these features. Therefore, the digital images need to be classified according to the class information of the digital images. Before the digital images are classified, the digital images need to be recognized to obtain the class information. Then, the digital images are classified by using the class information. The common class information includes numeral, character, person, animal and food, and may also be other class information.

Third step, classify the semantic labels into a set of at least one class of semantic labels according to the class information.

Similar to the classification process of the digital images, the semantic labels also need to be classified according to the class information herein.

Fourth step, obtain at least one semantic label model corresponding to the class information by training based on the class of digital images and a class of semantic labels associated with the class of digital images by using a machine learning process.

A variety of machine learning methods are available, which may be a decision tree method, a linear discriminant analysis method, a binary classification method, a support vector machine method, or other machine learning methods. The correlation between the digital images and a class of semantic labels is established by the machine learning method to obtain the semantic label model corresponding to the class information.

In some alternative implementations of the embodiment, the obtaining of at least one semantic label model corresponding to the class information by training based on the class of digital images and a class of semantic labels associated with the class of digital images by using a machine learning process may include the following steps.

First step, carry out granularity recognition on the class of digital images to obtain granularity information corresponding to the class of digital images.

Here, the granularity is sub-class of the class information. For example, when the digital image includes a puppy, the granularity information of the digital image may be the sort, the hair color and the size of the puppy, namely, the local granularity information is a further detailed description of the class information.

Second step, look up a class of semantic labels corresponding to the granularity information.

After the granularity information is obtained, a class of semantic labels corresponding to the granularity information may be determined according to the granularity information. For example, the granularity information is "an image including a dog; breed: Border Collie; hair color: black and white," and other similar granularity information may also be obtained from this digital image according to requirements and will not be described in detail herein. It can be seen from the granularity information that the class of semantic labels related to dogs should correspond to the granularity information. Assuming that there is only one dog in the digital image, the current class semantic label may be "a Border Collie with black and white hair."

Third step, obtain the semantic label model corresponding to the class information by training based on the granularity information and the class of semantic labels corresponding to the granularity information by using a machine learning process.

Since the granularity information corresponds to the class information, learning the correlation between the granularity information and the class of semantic labels by using a machine learning method is equivalent to obtaining the semantic label model corresponding to the class information.

In some alternative implementations of the embodiment, the carrying out of granularity recognition on the class of digital images to obtain granularity information corresponding to the class of digital images may include the following steps.

First step, carry out full-image recognition on the class of digital images to obtain full-image recognition information.

The full-image recognition refers to recognizing the entire digital image, and accordingly, the full-image recognition information is general description of the digital image. Still using the digital image with the puppy as an example, when there is only one puppy in the digital image without other image elements, the current full-image recognition information is an image including one puppy. When the digital image further includes another puppy (or image elements of other numbers and other types) beside the puppy, the current full-image recognition information is an image including two puppies.

Second step, determine an attention area from the above-mentioned class of digital images.

Here, the attention area is an area in which the granularity recognition is carried out on the class of digital images. Still using the digital image with the puppy as an example, the puppy will not occupy the entire image. Therefore, when the puppy is recognized, the images (body parts, size, color) of the puppy itself are recognized, and these images of the puppy itself become the attention area. Other parts (blank or other image contents) of the digital image do not form the attention area.

Third step, carry out the granularity recognition on the images in the attention area to obtain the local recognition information.

After the attention area is determined, the image in the attention area is recognized to obtain the local recognition information. Using the digital image including the puppy as an example, the current local recognition information includes the head, the body and the tail of the puppy, and may also include the hair color of the head, the hair color of the body and the hair color of the tail, namely, the local recognition information is specific description of the digital image.

Fourth step, combine the full-image recognition information and the local recognition information to form the granularity information.

When there is only one puppy in the digital image, the granularity information is "an image including a puppy; breed: border collie; hair color: black and white."

It can be seen from the above description that the method in the embodiment determines the semantic label corresponding to the digital image by the machine learning method, and may quickly and accurately recognize the digital image. Since the semantic label corresponding to the digital image is looked up by using a semantic label model, the accuracy is very high.

Step 203, introduce the digital image into the semantic label model to obtain full-image recognition information and local recognition information corresponding to the digital image, and combine the full-image recognition information and the local recognition information to form a semantic label.

Here, the full-image recognition information is a summarized description of the digital image, and the local recognition information is a detailed description of the digital image.

After the digital image is introduced into the semantic label model, a corresponding semantic label will be obtained. If the digital image is sent from the terminal device 101, 102 or 103, the semantic label is sent to the corresponding terminal device 101, 102 or 103.

Figure 3:
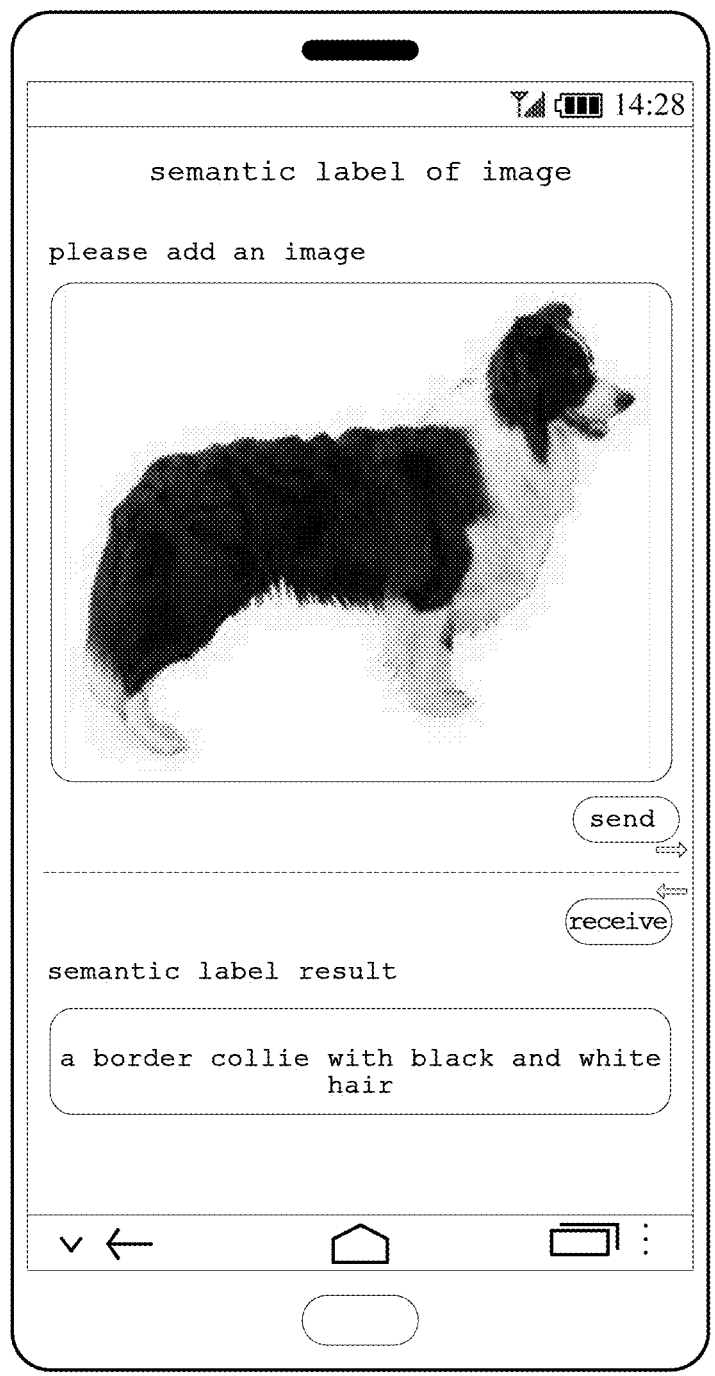
FIG. 3 is a schematic diagram of an application scenario of a method for obtaining a semantic label of a digital image according to the present application.

Continue referring to FIG. 3, it is a schematic diagram of an application scenario of a method for obtaining a semantic label of a digital image according to the embodiment. FIG. 3 displays a process of obtaining a semantic label of a digital image by using a terminal device. It can be seen from FIG. 3 that the terminal device inputs a digital image, and sends the digital image to an apparatus for obtaining a semantic label of the digital image. The apparatus for obtaining the semantic label of the digital image looks up a semantic label model corresponding to the digital image, and carries out class analysis on the digital image to determine that the digital image includes a dog image. Then, the apparatus selects a semantic label model corresponding to dogs. After the image is input into the semantic label model, the apparatus determines that the full-image recognition information of the digital image is an image including a puppy. The apparatus then determines the position (namely, an attention area) of the puppy in the digital image, and recognizes the position of the puppy in the digital image to obtain specific features of the puppy, for example, the breed and hair color of the puppy, so as to obtain the granularity information (an image including a puppy; breed: border collie; hair color: black and white) of the digital image. And then, the apparatus looks up semantic labels (namely, the class of semantic labels) related to dogs. It should be noted that, when no semantic label completely conforming to the granularity information can be found, a semantic label corresponding to the granularity information may be obtained by extracting corresponding keywords from a plurality of semantic labels. For example, when the current granularity information is "an image including a puppy; breed: border collie; hair color: black and white", and the existing semantic labels related to dogs are "dalmatian with black and white hair", "border collie with yellow and white hair" (or other information), "black and white" and "border collie" can be respectively extracted from these two semantic labels, and these two semantic labels are combined to form a resultant semantic label "a border collie with black and white hair". Finally, the semantic label "a border collie with black and white hair" is sent to the terminal device to achieve the obtaining of the semantic label of the digital image.

According to the method provided in the embodiment of the present application, the digital image is obtained first; then a semantic label model corresponding to the digital image is looked up, and a semantic label is obtained by using the semantic label model, which may improve the accuracy of obtaining the semantic label corresponding to the digital image.

Figure 4:
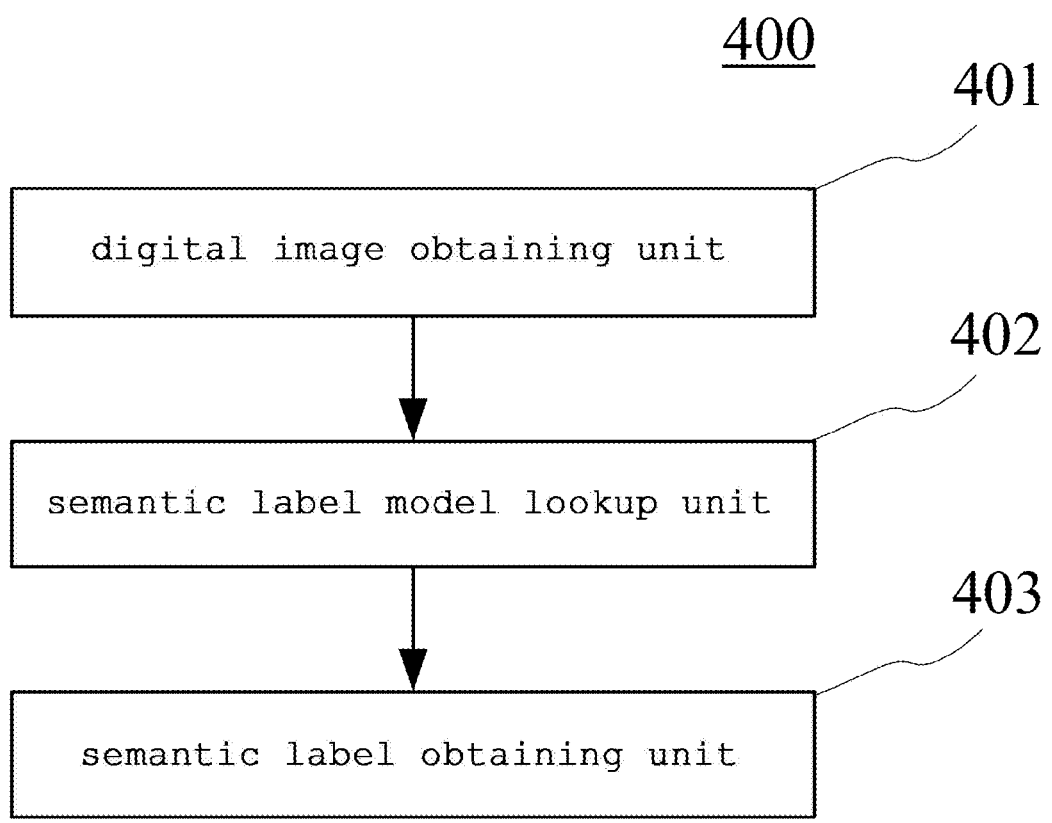
FIG. 4 is a schematic diagram of a structure of an apparatus for obtaining a semantic label of a digital image according to an embodiment of the present application.

Referring to FIG. 4, as an implementation for the methods shown in the above figures, an embodiment of the present application provides an apparatus for obtaining a semantic label of a digital image, the apparatus in this embodiment corresponds to the method of the embodiment shown in FIG. 2, and the apparatus may be specifically applied in a variety of electronic devices.

As shown in FIG. 4, the apparatus 400 for obtaining the semantic label of the digital image in the embodiment includes: a digital image obtaining unit 401, a semantic label model lookup unit 402 and a semantic label obtaining unit 403. Here, the digital image obtaining unit 401 is used for obtaining the digital image; the semantic label model lookup unit 402 is used for looking up a semantic label model corresponding to the digital image, the semantic label model being used for representing correlation between digital images and semantic labels, and a semantic label being used for literally describing a digital image; and the semantic label obtaining unit 403 is used for introducing the digital image into the semantic label model to obtain full-image recognition information and local recognition information corresponding to the digital image, and combine the full-image recognition information and the local recognition information to form a semantic label, the full-image recognition information being a summarized description of the digital image, and the local recognition information being a detailed description of the digital image.

In some alternative implementations of the embodiment, the semantic label model lookup unit 402 may include a class information determining subunit (not shown in the figure) and a semantic label model lookup subunit (not shown in the figure). Here, the class information determining subunit is used for carrying out class analysis on the digital image to determine class information of the digital image, the class information comprising at least one of numeral, character, person, animal and food; and the semantic label model lookup subunit is used for looking up the semantic label model corresponding to the class information.

In some alternative implementations of the embodiment, the apparatus 400 for obtaining the semantic label of the digital image in the embodiment may further include a semantic label model establishing unit (not shown in the figure), used for establishing the semantic label model. The semantic label model establishing unit may include an extraction subunit (not shown in the figure), a digital image class set obtaining subunit (not shown in the figure), a semantic label class set obtaining subunit (not shown in the figure) and a semantic label model establishing subunit (not shown in the figure).

Here, the extraction subunit is used for extracting digital images and semantic labels from a digital image set and a semantic label set, respectively; the digital image class set obtaining subunit is used for classifying the digital images into a set of at least one class of digital images according to the class information, the class information comprising at least one of numeral, character, person, animal and food; the semantic label class set obtaining subunit is used for classifying the semantic labels into a set of at least one class of semantic labels according to the class information;

and the semantic label model establishing subunit is used for obtaining at least one semantic label model corresponding to the class information by training based on the class of digital images and a class of semantic labels associated with the class of digital images by using a machine learning process.

In some alternative implementations of the embodiment, the digital image class set obtaining subunit further includes a class information recognition module (not shown in the figure), used for recognizing the digital image to obtain the class information.

In some alternative implementations of the embodiment, the semantic label model establishing subunit may include: a granularity information obtaining module (not shown in the figure), a semantic label class lookup module (not shown in the figure) and a semantic label model establishing module (not shown in the figure). Here, the granularity information obtaining module is used for carrying out granularity recognition on the class of digital images to obtain granularity information corresponding to the class of digital images, the granularity information being sub-classification information of the class information; the semantic label class lookup module is used for looking up a class of semantic labels corresponding to the granularity information; and the semantic label model establishing module is used for obtaining the semantic label model corresponding to the class information by training based on the granularity information and the class of semantic labels corresponding to the granularity information by using a machine learning process.

In some alternative implementations of the embodiment, the granularity information obtaining module may further include: a full-image recognition information recognizing sub-module (not shown in the figure), an attention area determining sub-module (not shown in the figure), a local recognition information recognizing sub-module (not shown in the figure) and a granularity information obtaining sub-module (not shown in the figure). Here, the full-image recognition information recognizing sub-module is used for carrying out full-image recognition on the class of digital images to obtain full-image recognition information. The attention area determining sub-module is used for determining an attention area from the class of digital images, the attention area being an area in which the granularity recognition is carried out on the class of digital images; the local recognition information recognizing sub-module is used for carrying out the granularity recognition on the images in the attention area to obtain the local recognition information; and the granularity information obtaining sub-module is used for combining the full-image recognition information and the local recognition information to form the granularity information.

The embodiment further provides a device for obtaining a semantic label of a digital image, including the apparatus for obtaining the semantic label of the digital image.

Figure 5:
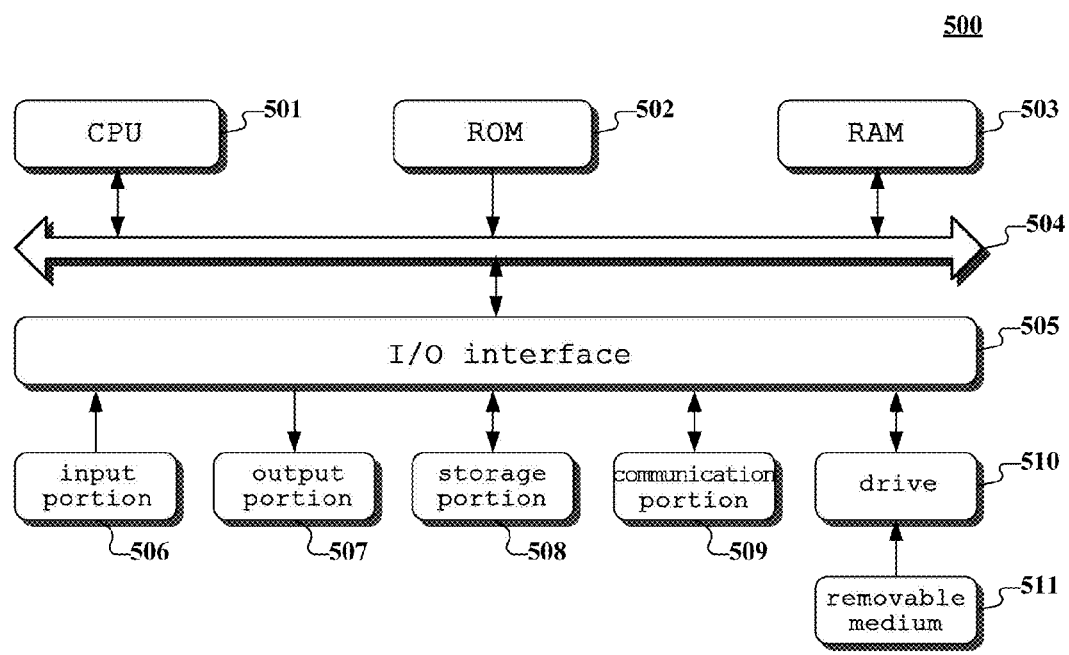
FIG. 5 is a schematic diagram of a structure of a computer system of a server suitable for implementing the embodiments of the present application.

Referring to FIG. 5, a schematic structural diagram of a computer system 500 adapted to implement a server for obtaining a semantic label of a digital image of the embodiments of the present application is shown.

As shown in FIG. 5, the computer system. 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a digital image obtaining unit, a semantic label model lookup unit and a semantic label obtaining unit, where the names of these units or modules are not considered as a limitation to the units or modules. For example, the semantic label obtaining unit may also be described as "a unit for obtaining a semantic label".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. When the one or more programs are executed by a device, the device is to: obtain the digital image; look up a semantic label model corresponding to the digital image, the semantic label model being used for representing correlation between digital images and semantic labels, and a semantic label being used for literally describing a digital image; and introduce the digital image into the semantic label model to obtain full-image recognition information and local recognition information corresponding to the digital image, and combine the full-image recognition information and the local recognition information to form a semantic label, the full-image recognition information being a summarized description of the digital image, and the local recognition information being a detailed description of the digital image.

The foregoing is only a description of the preferred embodiments of the present application and the applied technical principles. It should be appreciated by those skilled in the art that the inventive scope of the present application is not limited to the technical solutions formed by the particular combinations of the above technical features.

The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for obtaining a semantic label of a digital image, comprising:
   obtaining the digital image;
   looking up a semantic label model corresponding to the digital image, the semantic label model being used for representing correlation between digital images and semantic labels, and a semantic label being used for literally describing a digital image; and
   introducing the digital image into the semantic label model to obtain full-image recognition information and local recognition information corresponding to the digital image, and combining the full-image recognition information and the local recognition information to form a semantic label, the full-image recognition information being a summarized description of the digital image, and the local recognition information being a detailed description of the digital image;
   the method further comprising:
   establishing the semantic label model, wherein the establishing the semantic label model comprises:
   extracting digital images and semantic labels from a digital image set and a semantic label set, respectively;
   classifying the digital images into a set of at least one class of digital images according to the class information, the class information comprising at least one of numeral, character, person, animal and food;
   classifying the semantic labels into a set of at least one class of semantic labels according to the class information; and
   obtaining at least one semantic label model corresponding to the class information by training based on the class of digital images and a class of semantic labels associated with the class of digital images by using a machine learning process;
   wherein the obtaining of at least one semantic label model corresponding to the class information by training based on the class of digital images and a class of semantic labels associated with the class of digital images by using a machine learning process comprises:
   carrying out granularity recognition on the class of digital images to obtain granularity information corresponding to the class of digital images, the granularity information being sub-classification information of the class information;
   looking up a class of semantic labels corresponding to the granularity information; and
   obtaining the semantic label model corresponding to the class information by training based on the granularity information and the class of semantic labels corresponding to the granularity information by using a machine learning process.

2. The method according to claim 1, wherein the looking up of a semantic label model corresponding to the digital image comprises:
   carrying out class analysis on the digital image to determine class information of the digital image, the class information comprising at least one of numeral, character, person, animal and food; and
   looking up the semantic label model corresponding to the class information.

3. The method according to claim 1, wherein the classifying of the digital images into a set of at least one class of digital images according to the class information comprises:
   recognizing the digital images to obtain the class information.

4. The method according to claim 1, wherein the carrying out of granularity recognition on the class of digital images to obtain granularity information corresponding to the class of digital images comprises:
   carrying out full-image recognition on the class of digital images to obtain full-image recognition information;
   determining an attention area from the class of digital images, the attention area being an area in which the granularity recognition is carried out on the class of digital images;
   carrying out the granularity recognition on the images in the attention area to obtain the local recognition information; and
   combining the full-image recognition information and the local recognition information to form the granularity information.

5. An apparatus for obtaining a semantic label of a digital image, comprising:
   at least one processor; and
   a memory storing instructions, which when executed by the at least one processor, cause the at least one processor to perform operations, the operations comprising:
   obtaining the digital image;
   looking up a semantic label model corresponding to the digital image, the semantic label model being used for representing correlation between digital images and semantic labels, and a semantic label being used for literally describing a digital image; and
   introducing the digital image into the semantic label model to obtain full-image recognition information and local recognition information corresponding to the digital image, and combining the full-image recognition information and the local recognition information to form a semantic label, the full-image recognition information being a summarized description of the digital image, and the local recognition information being a detailed description of the digital image;
   wherein the operations further comprise:
   establishing the semantic label model, the establishing the semantic label model comprising:
   extracting digital images and semantic labels from a digital image set and a semantic label set, respectively;
   classifying the digital images into a set of at least one class of digital images according to the class information, the class information comprising at least one of numeral, character, person, animal and food;
   classifying the semantic labels into a set of at least one class of semantic labels according to the class information; and obtaining at least one semantic label model corresponding to the class information by training based on the class of digital images and a class of semantic labels associated with the class of digital images by using a machine learning process;

wherein the obtaining of at least one semantic label model corresponding to the class information by training based on the class of digital images and a class of semantic labels associated with the class of digital images by using a machine learning process comprises:

carrying out granularity recognition on the class of digital images to obtain granularity information corresponding to the class of digital images, the granularity information being sub-classification information of the class information;

looking up a class of semantic labels corresponding to the granularity information; and obtaining the semantic label model corresponding to the class information by training based on the granularity information and the class of semantic labels corresponding to the granularity information by using a machine learning process.

6. The apparatus according to claim 5, wherein the looking up of a semantic label model corresponding to the digital image comprises:

carrying out class analysis on the digital image to determine class information of the digital image, the class information comprising at least one of numeral, character, person, animal and food; and looking up the semantic label model corresponding to the class information.

7. The apparatus according to claim 5, wherein the classifying of the digital images into a set of at least one class of digital images according to the class information comprises:

recognizing the digital images to obtain the class information.

8. The apparatus according to claim 5, wherein the carrying out of granularity recognition on the class of digital images to obtain granularity information corresponding to the class of digital images comprises:

carrying out full-image recognition on the class of digital images to obtain full-image recognition information;

determining an attention area from the class of digital images, the attention area being an area in which the granularity recognition is carried out on the class of digital images;

carrying out the granularity recognition on the images in the attention area to obtain the local recognition information; and combining the full-image recognition information and the local recognition information to form the granularity information.

9. A non-transitory storage medium storing one or more programs, the one or more programs when executed by an apparatus, causing the apparatus to perform operations, the operations comprising:

obtaining the digital image;

looking up a semantic label model corresponding to the digital image, the semantic label model being used for representing correlation between digital images and semantic labels, and a semantic label being used for literally describing a digital image; and introducing the digital image into the semantic label model to obtain full-image recognition information and local recognition information corresponding to the digital image, and combining the full-image recognition information and the local recognition information to form a semantic label, the full-image recognition information being a summarized description of the digital image, and the local recognition information being a detailed description of the digital image;

wherein the operations further comprise:

establishing the semantic label model, the establishing the semantic label model comprising:

extracting digital images and semantic labels from a digital image set and a semantic label set, respectively;

classifying the digital images into a set of at least one class of digital images according to the class information, the class information comprising at least one of numeral, character, person, animal and food;

classifying the semantic labels into a set of at least one class of semantic labels according to the class information; and obtaining at least one semantic label model corresponding to the class information by training based on the class of digital images and a class of semantic labels associated with the class of digital images by using a machine learning process;

wherein the obtaining of at least one semantic label model corresponding to the class information by training based on the class of digital images and a class of semantic labels associated with the class of digital images by using a machine learning process comprises:

carrying out granularity recognition on the class of digital images to obtain granularity information corresponding to the class of digital images, the granularity information being sub-classification information of the class information;

looking up a class of semantic labels corresponding to the granularity information; and obtaining the semantic label model corresponding to the class information by training based on the granularity information and the class of semantic labels corresponding to the granularity information by using a machine learning process.

* * * * *